United States Patent [19]
Kikuchi

[11] Patent Number: 6,061,494
[45] Date of Patent: *May 9, 2000

[54] IMAGE RECORDING/REPRODUCING APPARATUS HAVING A MEMORY WITH A VARIABLY—SET THRESHOLD

[75] Inventor: Takayuki Kikuchi, Tokyo, Japan

[73] Assignee: Canon Kabushiki Kaisha, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/813,996

[22] Filed: Mar. 10, 1997

Related U.S. Application Data

[63] Continuation of application No. 08/300,123, Sep. 2, 1994, abandoned.

[30] Foreign Application Priority Data

Sep. 17, 1993 [JP] Japan .................................. 5-255114

[51] Int. Cl.[7] ...................................................... H04N 5/76
[52] U.S. Cl. ................................ 386/47; 386/51; 386/113
[58] Field of Search .............................. 360/38.1, 25, 65, 360/10.1, 10.2, 10.3; 369/44.34, 44.35; 386/2–3, 13, 20, 21, 40, 47, 49, 85, 51, 90–91, 113, 116; H04N 5/94, 5/945, 5/95, 5/953, 5/956, 9/88, 9/882, 9/885, 9/888, 9/89, 9/893, 9/896

[56] References Cited

U.S. PATENT DOCUMENTS

| | | | |
|---|---|---|---|
| 4,287,529 | 9/1981 | Tatami et al. | 360/38.1 X |
| 4,408,326 | 10/1983 | Takeuchi et al. | 360/38.1 X |
| 4,819,222 | 4/1989 | Kimura | 369/59 X |
| 4,893,192 | 1/1990 | Takemura | 386/51 |
| 4,953,034 | 8/1990 | Kanda | 386/49 |
| 5,179,451 | 1/1993 | Takeshita et al. | 386/113 |
| 5,223,946 | 6/1993 | Mannen | 386/2 |
| 5,245,482 | 9/1993 | Sagawa et al. | 360/38.1 |
| 5,392,129 | 2/1995 | Ohtaka et al. | 386/124 |
| 5,416,600 | 5/1995 | Matsumi et al. | 386/116 |
| 5,486,956 | 1/1996 | Urata | 360/65 |
| 5,493,412 | 2/1996 | Koyama et al. | 360/65 X |
| 5,502,698 | 3/1996 | Mochizuki | 369/44.35 X |
| 5,532,837 | 7/1996 | Ootaka et al. | 386/116 |
| 5,533,031 | 7/1996 | Dounn et al. | 360/65 X |

*Primary Examiner*—Thai Tran
*Attorney, Agent, or Firm*—Fitzpatrick, Cella, Harper & Scinto

[57] ABSTRACT

Image recording/reproducing apparatus having a memory with a variably-set threshold includes reproducing circuitry for reproducing data recorded on a recording medium. Memory structure is provided for storing the data reproduced by the reproducing circuitry. Storage structure is provided for storing in the memory structure reproduced data having at least a predetermined level, the predetermined level being variably set.

25 Claims, 9 Drawing Sheets

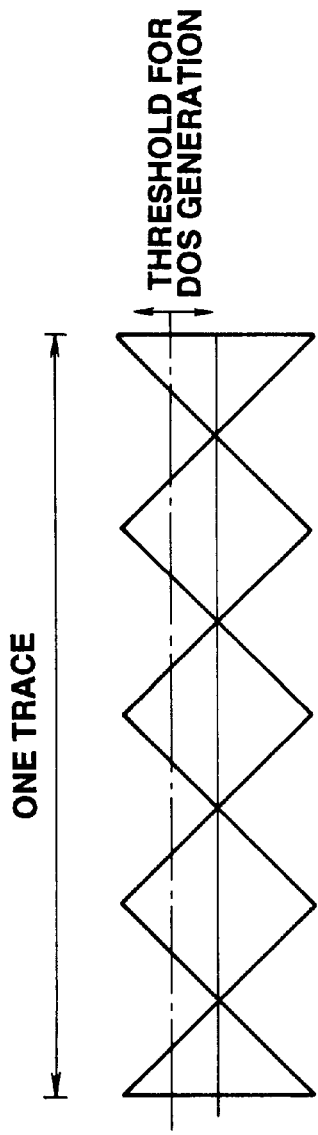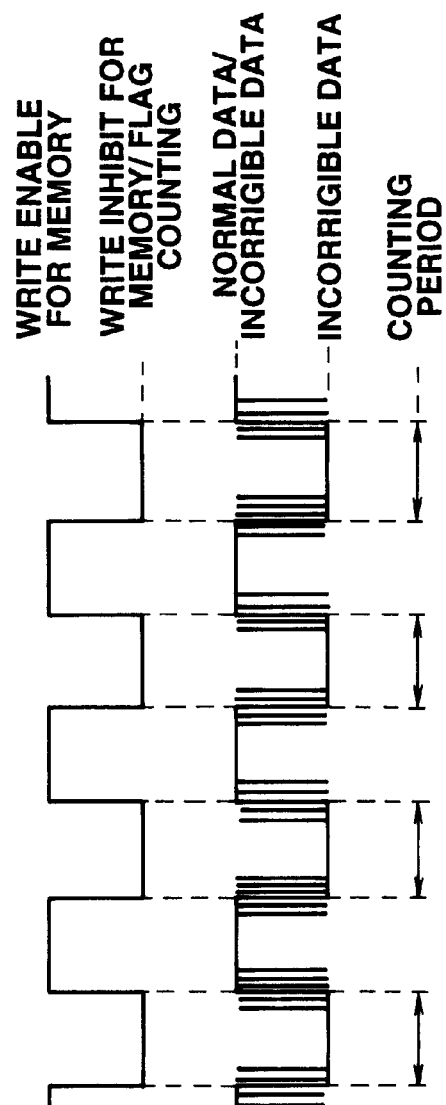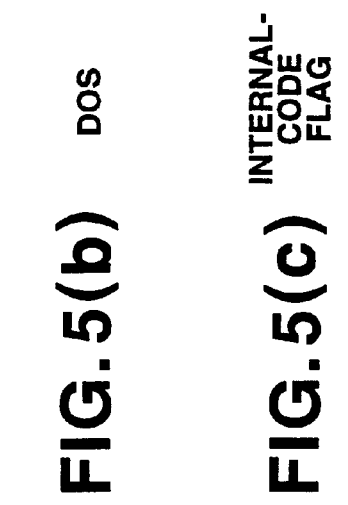

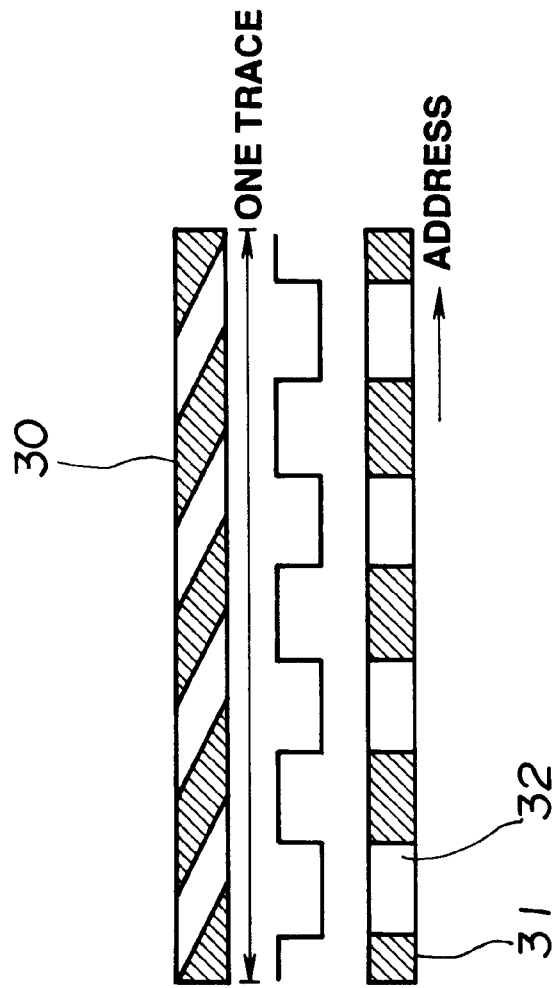

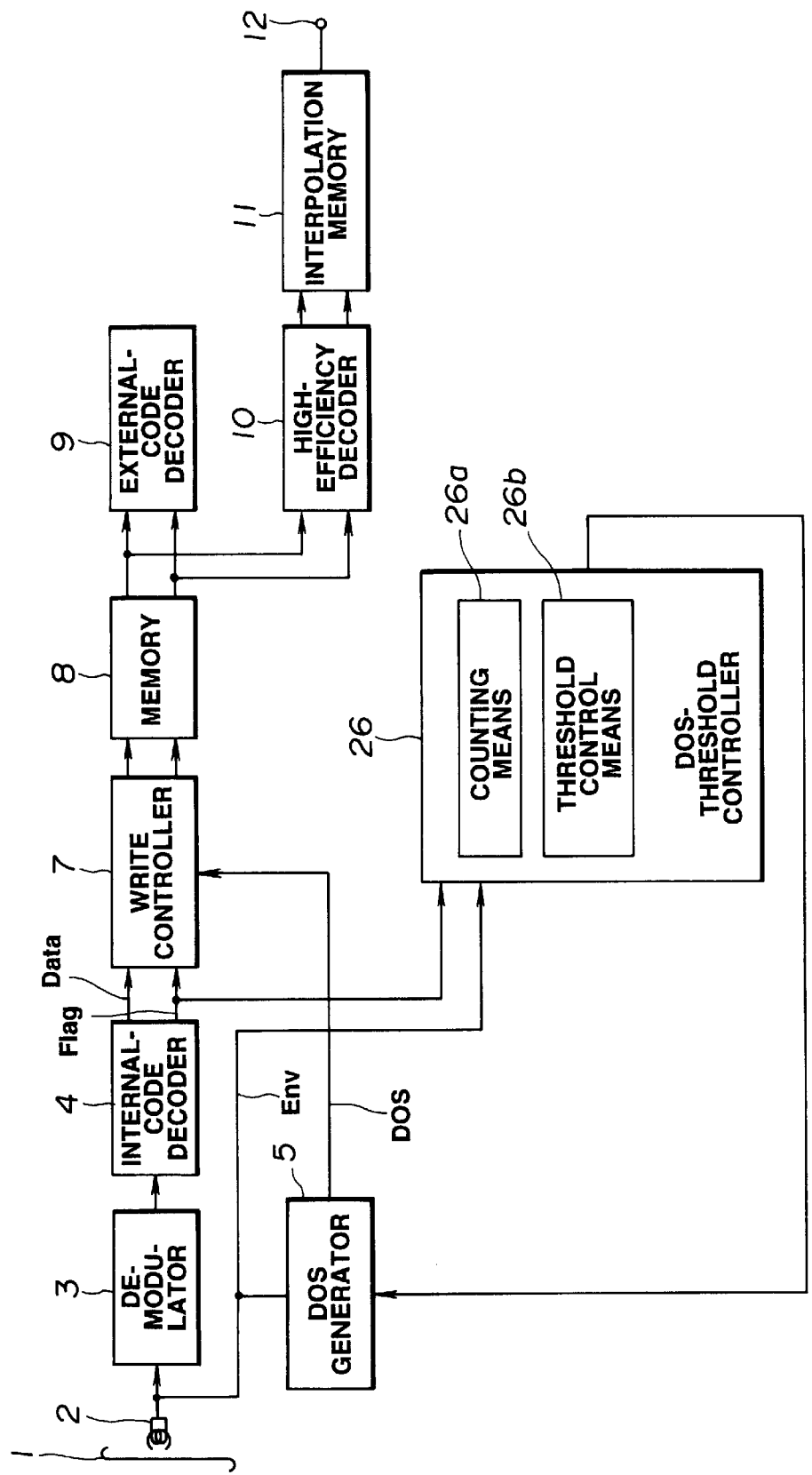

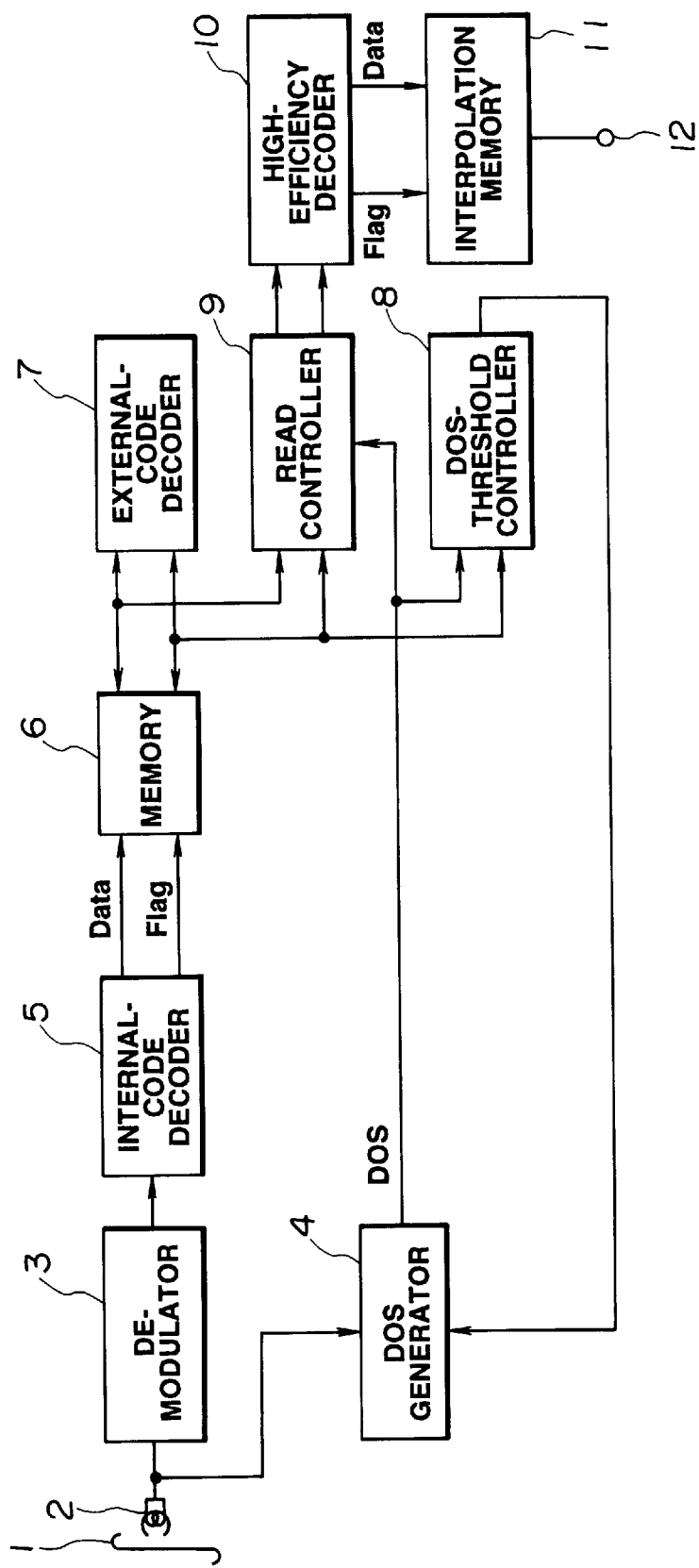

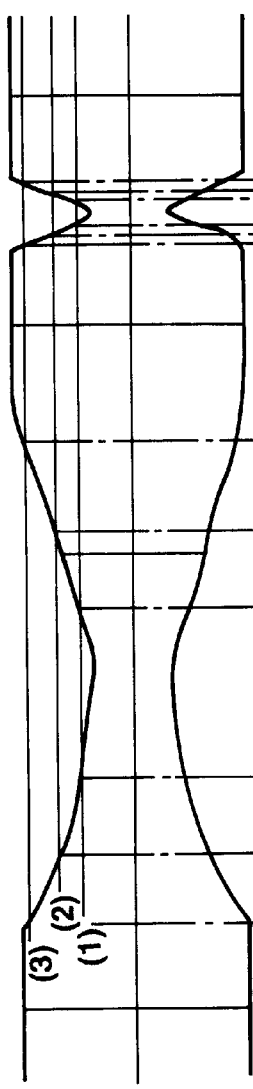
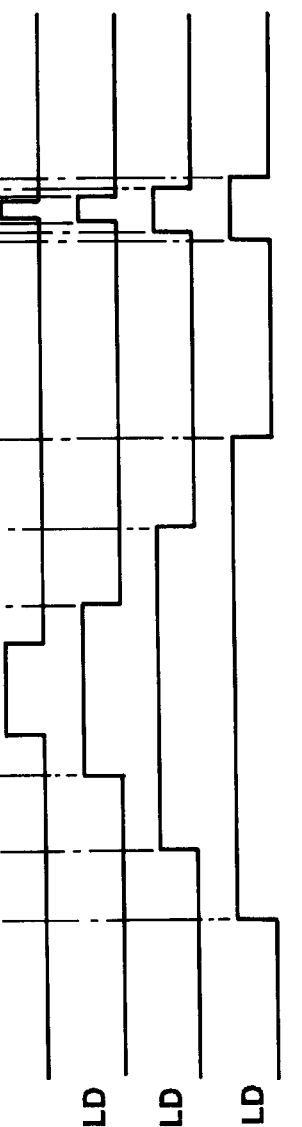
FIG.10(a) SWP
FIG.10(b) ENVELOPE
FIG.10(c) FINAL FLAG
FIG.10(d) DOS { THRESHOLD (1), THRESHOLD (2), THRESHOLD (3) }

IMAGE RECORDING/REPRODUCING APPARATUS HAVING A MEMORY WITH A VARIABLY— SET THRESHOLD

This application is a continuation of application Ser. No. 08/300,123, filed Sep. 2, 1994, now abandoned.

BACKGROUND OF THE INVENTION

1. Field of the Invention

This invention relates to an image recording/reproducing apparatus, such as a digital VCR (video cassette recorder) or the like.

2. Description of the Related Art

Recently, consumer-use VCR's, in which an image signal is subjected to high-efficiency encoding, and is recorded on or reproduced from a recording medium, such as a magnetic tape or the like, have been proposed. In such apparatuses, an image signal is divided into blocks, each comprising a predetermined number of pixels, and is then subjected to orthogonal transform, such as discrete cosine transform or the like. Coefficients after the transform are subjected to quantization/entropy encoding, and are recorded.

When variable-length encoding is performed in a VCR, it is desirable to make the amount of codes constant in each predetermined block, in consideration of particular reproduction, error propagation and the like. Accordingly, a method has been known in which the amount of codes is adjusted by adjusting quantization parameters of image data to be subjected to variable-length encoding.

FIG. 1 illustrates a format obtained by adjusting the amount of codes, having the configuration of product codes, in the above-described method using discrete cosine transform. In FIG. 1, the amount of codes in each of M (three in FIG. 1) sync blocks has a fixed length. A synchronizing signal (SYNC) and additional information (ID) are recorded at the head of each of sync blocks 1, 2 and 3.

As shown in FIG. 2, error-correcting codes, such as RS codes and the like, are added to data in each sync block, and the resultant data is recorded on a magnetic recording tape.

When reproducing recorded data to which error-correcting codes are added in the above-described manner, after demodulating a reproduced output from the magnetic tape, internal-code correction and external-code correction are performed, and the reproduced encoded data subjected to such error correction is decoded.

In the above-described VCR, the reproduced state from the magnetic head changes in accordance with a reproducing mode, such as normal reproduction or particular reproduction.

That is, in normal reproduction, helical tracks formed during the recording operation can be exactly traced in a reproducing operation. Hence, a stable reproduced output is obtained.

On the other hand, in particular reproduction, such as high-speed reproduction or low-speed reproduction, the relative speed between the magnetic head and the magnetic tape changes from that during the recording operation. Hence, the inclination of the scanning loci of the reproducing magnetic head does not coincide with the inclination of helical tracks, so that a stable reproducing state cannot be obtained.

In such a case in which a stable reproducing state cannot be obtained, the above-described error correction using error-correcting codes is not exactly performed, thereby causing erroneous correction.

SUMMARY OF THE INVENTION

The present invention has been made in consideration of the above-described problems.

It is an object of the present invention to prevent degradation in the picture quality caused by a change in the reproducing state.

According to one aspect, the present invention, which achieves the above-described object, relates to an image reproducing apparatus comprising reproducing means for reproducing data recorded on a recording medium, memory means for storing the data reproduced by the reproducing means, and means for storing reproduced data having at least a predetermined level in the memory means. The predetermined level is variably set.

According to another aspect, the present invention relates to an image recording/reproducing apparatus comprising encoding means for performing error-detection/correction encoding of input digital image information, recording/reproducing means for recording data subjected to the error detection/correction encoding by the encoding means on a recording medium and for reproducing data from the recording medium, decoding means for performing error-detection/correction decoding of the data reproduced from the recording medium and for outputting flag information indicating a result of the detection, storage means for storing the reproduced data subjected to the error-detection/correction decoding by the decoding means, interpolation means for interpolating incorrigible reproduced data by the decoding means, dropout-signal generation means for detecting the amplitude of the reproduced data and for generating a dropout signal indicating the quality of the reproduced data using a threshold, write control means for controlling an operation of writing the reproduced data in the storage means in response to the dropout signal, counting means for counting the flag information output from the decoding means during a predetermined period indicated by the dropout signal, determination means for determining an error state of a transmission channel by a count value output from the counting means, and threshold control means for changing a threshold for generating the dropout signal in accordance with a result of the determination of the determination means.

According to still another aspect, the present invention relates to an image recording/reproducing apparatus comprising encoding means for performing error-detection/correction encoding of digital image information, recording/reproducing means for recording and reproducing data, decoding means for performing error-detection/correction decoding of reproduced data, storage means for storing the reproduced data subjected to the error-detection/correction decoding by the decoding means, interpolation means for interpolating reproduced data incorrigible by the decoding means, dropout-signal generation means for detecting the amplitude of the reproduced data and for generating a dropout signal indicating the quality of the reproduced data using a threshold, write control means for controlling an operation of writing the reproduced data in the storage means in response to the dropout signal, counting means for setting the variation range of the threshold for generating the dropout signal to a predetermined range, for detecting reproduced data having an amplitude within the variation range, and for counting flag information indicating a result of determination by the decoding means during a period within the variation range, and threshold control means for changing the threshold for generating the dropout signal within the variation range in accordance with a count value of the counting means.

According to yet another aspect, the present invention relates to a recording/reproducing apparatus comprising means for performing error-detection/correction encoding of digital image information, means for recording data on and reproducing data from a recording medium, error-detection/ correction decoding means for performing error-detection/ correction decoding of reproduced data, storage means for storing the reproduced data subjected to the error-detection/ correction decoding, interpolation means for interpolating incorrigible reproduced data in the error-detection/ correction decoding, dropout-signal generation means for generating a dropout signal indicating the state of the envelope of reproduced data, counting means for counting flag information indicating a result of determination by the error-detection/correction decoding during a predetermined period indicated by the dropout signal, determination means for determining an error state of a transmission channel based on a count value of the counting means, threshold veneration means for changing a threshold for the dropout signal in accordance with a result of the determination, and control means for performing output control of reproduced data to the interpolation means in response to the dropout signal.

A write inhibit period is set by determining the state of flag information indicating correction processing and changing a threshold for generating a dropout signal based on the result of the determination. A writing operation for the storage means is inhibited during the write inhibit period indicated by the dropout signal, so that reproduced data exceeding the correction capability is not written in the storage means. Hence, the interpolation of reproduced data can be assuredly performed.

The foregoing and other objects, advantages and features of the present invention will become more apparent from the following detailed description of the preferred embodiments taken in conjuction with the accompanying drawings.

BRIEF DESCRIPTION OF THE DRAWINGS

FIGS. 5(a) through 5(c) are diagrams illustrating the relationship among an envelope, a DOS (dropout signal) and a flag during search reproduction in the first embodiment;

FIGS. 6(a) through 6(c) are diagrams illustrating a write state of data in a memory for one trace in the first embodiment;

FIG. 7 is a schematic block diagram illustrating the configuration of an image recording/reproducing apparatus according to a second embodiment of the present invention;

FIG. 9 is a schematic block diagram illustrating the configuration of an image reproducing apparatus according to a third embodiment of the present invention;

FIGS. 10(a) through 10(d) are diagrams illustrating the relationship among an envelope, a DOS and a flag during search reproduction in the third embodiment.

DETAILED DESCRIPTION OF THE PREFERRED EMBODIMENTS

A description will now be provided of an image recording/reproducing apparatus according to a first embodiment of the present invention with reference to the drawings. An important feature of the image recording/ reproducing apparatus of the present embodiment is in that the result of internal-code decoding is checked during a period assigned by a dropout signal DOS, and a threshold for generating the dropout signal DOS is changed in accordance with the result of the check.

Figure 3:
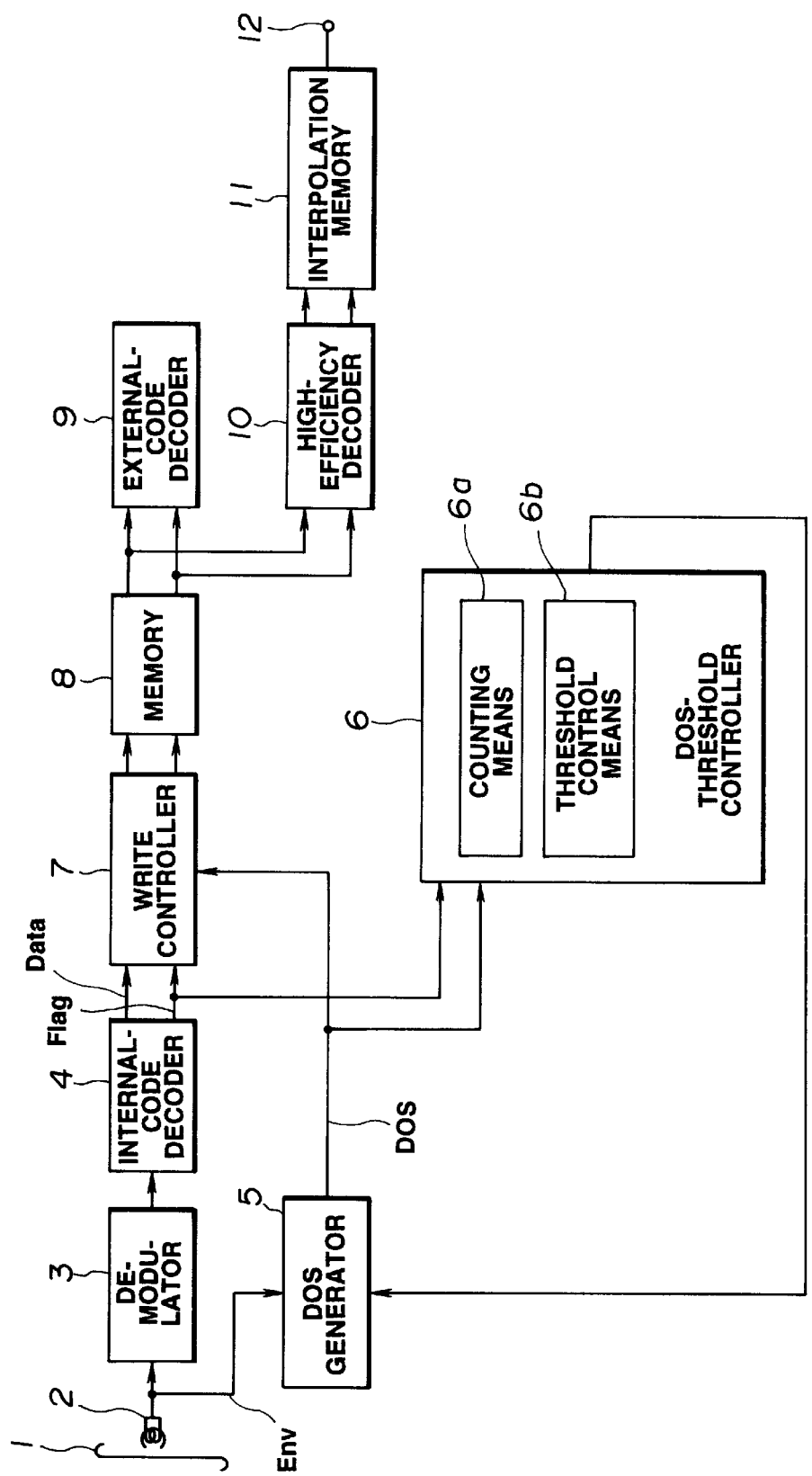
FIG. 3 is a schematic diagram illustrating the configuration of an image recording/reproducing apparatus according to a first embodiment of the present invention.

FIG. 3 is a schematic block diagram illustrating the configuration of the image recording/reproducing apparatus of the first embodiment.

In FIG. 3, there are shown a magnetic recording tape 1, a reproducing head 2, and a demodulator 3. The demodulator 3 demodulates reproduced data detected by the reproducing head 2.

An internal-code decoder 4 corrects errors in internal codes in the demodulated data. A DOS generator 5 determines envelope information Env of the reproduced data detected by the reproducing head 2, and generates a dropout signal DOS. Reference numeral 6 represents a controller for a threshold for the dropout signal. The DOS-threshold controller 6 checks flag information Flag output from the internal-code decoder 4 during an inactive period of the dropout signal DOS, and controls the threshold for generating the dropout signal DOS.

A write controller 7 controls data "Data" and the flag information "Flag" output from the internal-code decoder 4 in accordance with the state of the dropout signal DOS. A memory 8 stores the data Data and the flag information Flag whose output is controlled by the write controller 7.

An external-code decoder 9 corrects errors in external codes in the data stored in the memory 8. A high-efficiency decoder 10 performs high-efficiency decoding of the data subjected to external-code-error correction from the memory 8. An interpolation memory 11 performs interpolation processing for block data for which error correction could not be performed in response to the flag information. Reference numeral 12 represents an output terminal.

A description will now be provided of the operation during search reproduction in which the effects of the image recording/reproducing apparatus of the first embodiment are particularly pronounced.

Figure 1:
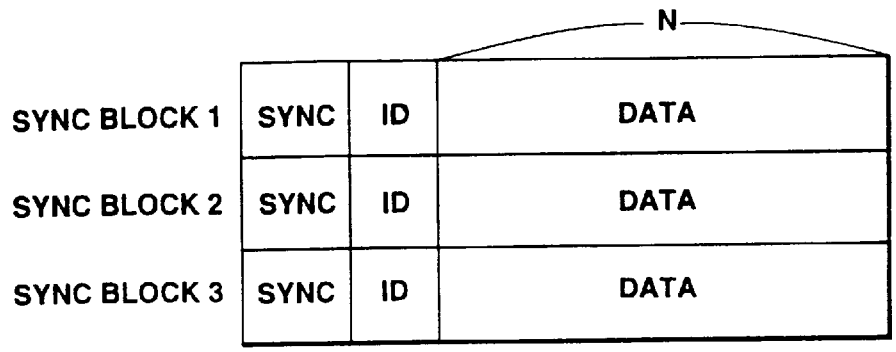
FIG. 1 is a diagram illustrating a sync-block format.
Figure 2:
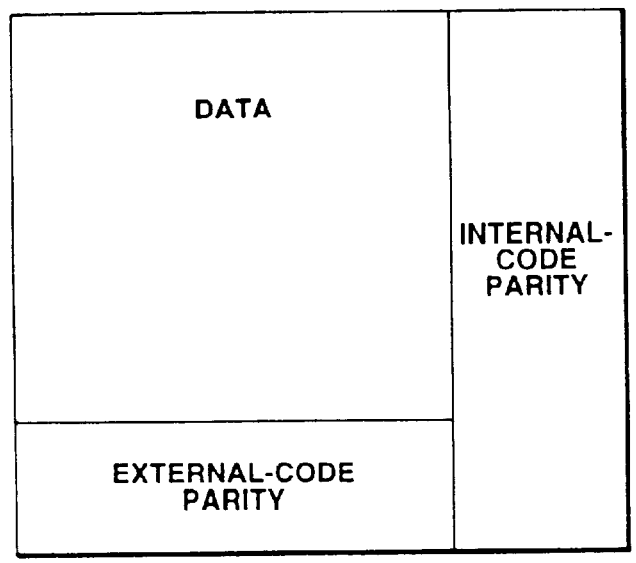
FIG. 2 is a diagram illustrating the configuration of error-correcting codes.
Figure 4:
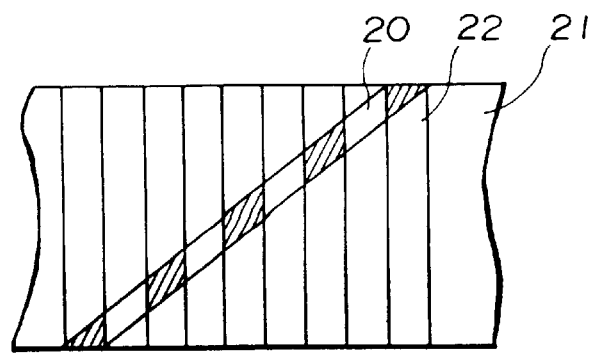
FIG. 4 is a diagram illustrating a trace pattern during search reproduction in the first embodiment.

As shown in FIG. 4, during search reproduction, an oblique trace 20 is provided for recording tracks 22 on a magnetic recording tape 21. FIG. 5(a) schematically illustrates the envelope of reproduced data from the trace 20.

The reproduced data detected by the reproducing head 2 is demodulated by the demodulator 3, and is supplied to the internal-code decoder 4. The internal-code decoder 4 corrects errors in internal codes, and outputs the data Data and the flag information Flag, serving as the results of the error correction, to the write controller 7. The write controller 7 performs write control for the memory 8 based on the dropout signal DOS provided from the DOS generator 5, so that data having low reliability is not written in the memory 8. As shown in FIG. 5(b), the dropout signal DOS comprises a memory-write-enable signal and a memory-write-inhibit signal. The DOS generator 5 generates a dropout signal DOS by determining the envelope information Env of the reproduced data, shown in FIG. 5(a), output from the reproducing head 2, using a threshold having a predetermined value.

The threshold is controlled by the DOS-threshold controller 6. In the present embodiment, during a time period in which a writing operation for the memory 8 is inhibited in response to the dropout signal DOS, i.e., during a counting period shown in FIG. 5(c), counting means 6b counts internal-code flags Flag output from the internal-code decoder 4. Such a counting operation is performed for a predetermined time period covering a plurality of traces, and the ratio of the total number of flags indicating the write inhibit period by the dropout signal DOS to the number of flags indicating exact correction or no error is obtained. The threshold for the dropout signal DOS generated from the DOS generator 5 is changed by threshold control means 6b so that the above-described ratio approaches a predetermined value. By repeating the same processing, the threshold for the dropout signal DOS is controlled.

Data subjected to write control by the dropout signal DOS in the above-decribed manner is input to the memory 8. The memory 8 has a capacity of storing data and flag information Flag for two tracks, and is subjected to bank switching in units of a trace.

Data 30 from a plurality of tracks obtained from one trace, shown in FIG. 6(a), is written in one of two bank memories of the memory 8 at an address corresponding to the trace in units of block data. The address at that time is generated based on ID added to each sync block. An address is interpolated for a missing data portion using a flywheel counter.

As shown in FIGS. 6(b) and 6(c), a writing operation of data is inhibited in units of a sync block during a write-inhibit period 32 for the memory 8 by the dropout signal DOS, and the state of the dropout signal DOS is written in a storage region.

Data is written in the memory 8 during a write-enable period 31, and a flag indicating a result of error correction of internal codes is written in a flag storage region.

The data written in the memory 8 is read during the next trace period together with the flag information Flag, and is transmitted to the high-efficiency decoder 10. At that time, the processing of external codes by the external-code decoder 9 is inhibited because all data are not provided. The data expanded by the high-efficiency decoder 10 is output to the interpolation memory 11.

The interpolation memory 11 stores data for one frame. Only data from the current track read from the memory 8 by the flag information is written in the interpolation memory 11 by addess assignment based on display-picture-frame-position information included in additional information ID.

The interpolation memory 11 stores data written before the preceding trace. Interframe interpolation is performed by updating the contents of memory data, comprising only normal data obtained from the current trace, reading preceding data for missing data, and outputting data for one frame to the output terminal 12.

According to the above-described configuration, the threshold for the dropout signal DOS can be controlled based on the result of error correction.

Although in the first embodiment a description has been provided of search reproduction, the present embodiment may be applied to any other reproducing state.

Figure 8:
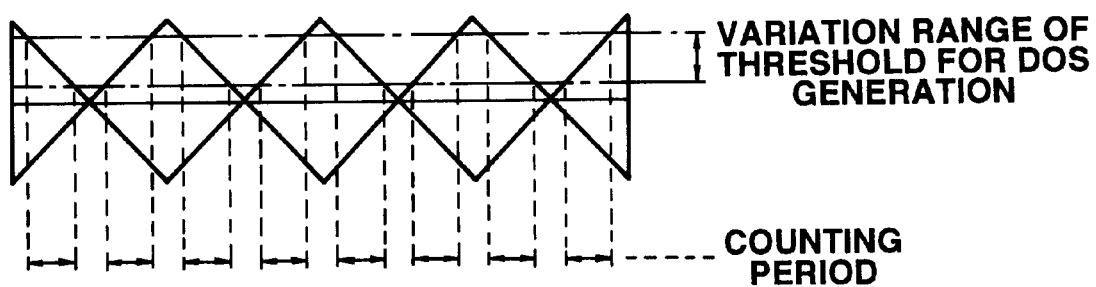
FIG. 8 is a diagram illustrating a counting period in the second embodiment.

Next, a description will be provided of an image recording/reproducing apparatus according to a second embodiment of the present invention with reference to FIGS. 7 and 8. In FIG. 7, the same components as those in the first embodiment are indicated by the same reference numerals, and a description thereof will be omitted.

FIG. 7 is a schematic block diagram illustrating the configuration of the image recording/reproducing apparatus of the second embodiment.

In FIG. 7, flag information Flag and envelope information Env are input to a DOS-threshold controller 26. As shown in FIG. 8, for the input envelope information Env, a variation range of the threshold for generating the dropout signal is set by threshold control means 26b. The lowest level at which a sufficient S/N ratio of the envelope information Env can be guaranteed is made the upper limit of the variation range, and the highest level at which a sufficient S/N ratio of the envelope information Env cannot be guaranteed is made the lower limit of the variation range.

The number of flag information Flag for sync blocks having envelope levels within the variation range is counted by counting means 26a, and the threshold for the dropout signal is set in accordance with the state of flag information Flag relating to results of correction for a predetermined time period covering a plurality of traces.

According to the above-described configuration, it is possible to set the threshold for the dropout signal DOS by determining a state of correcting data having unstable S/N ratios of envelope information Env, and to count flag information Flag of data having a low S/N ratio of envelope information Env even if accuracy is low.

As described above, according to the present embodiment, it is possible to control the apparatus so as to provide an appropriate threshold for generating a DOS in different reproducing states by using a result of internalcode correction for setting the threshold. It is thereby possible to suppress the generation of errors due to erroneous correction and therefore to improve the picture quality by assuredly performing interpolation processing of reproduced data which greatly exceeds the correction capability.

As described above, according to the first embodiment, a write inhibit period indicated by a dropout signal is set by determining a state of flag information indicating correction processing, and changing a threshold for generating the dropout signal based on the result of the determination. By inhibiting a writing operation for storage means during the write inhibit period indicated by the dropout signal, reproduced data exceeding the correction capability is not written in the storage means, so that it is possible to assuredly perform the interpolation of the reproduced data, and therefore to prevent degradation of the picture quality.

According to the second embodiment, since the envelope signal is monitored by the DOS-threshold controller, and flag information within the range, in which the S/N ratio of the envelope signal can be sufficiently guaranteed, is counted, accuracy in counting flag information can be improved.

Next, a third embodiment of the present invention will be described.

An important feature of the third embodiment is that results of internal-code decoding and external-code decoding are determined within a time period determined by a DOS, and the threshold for the DOS is converged to an appropriate value.

FIG. 9 is a block diagram of an apparatus according to the third embodiment.

In FIG. 9, there are shown a magnetic recording tape 1, and a reproducing head 2. A demodulator 3 demodulates reproduced data detected by the reproducing head 2. A DOS generator 4 determines the envelope of the reproduced data detected by the reproducing head 2, and generates a DOS. An internal-code decoder 5 corrects errors in internal codes of the demodulated data. A memory 6 stores data having corrected internal codes and flag information output from the internal-code decoder 5. An external-code decoder 7 reads the data having corrected internal codes stored in the memory 6 in units of an external code, corrects errors in external codes, and writes data having corrected external codes and flag information in the memory 6.

A DOS-threshold controller 8 compares flag information output from the memory 8 with a DOS, corresponding to the flag information, output from the DOS generator 4, and changes the threshold for generating the DOS. A read controller 9 controls whether or not corrected data output from the memory 6 is to be read in response to a DOS. A high-efficiency decoder 10 receives corrected data and flag information, controlled by a DOS, from the read controller 9. An interpolation memory 11 performs interpolation using decoded data and a corresponding flag signal. Reference numeral 12 represents an output terminal.

The operation of the apparatus will now be described.

In normal reproduction, the tracing of the reproducing head 2 is performed in substantially the same direction as that of recording tracks recorded on the recording tape 1. Data in units of product-code blocks are recorded on each recording track, and error correction processing is completed during a time period corresponding to each track shown in FIG. 10(a).

If the recording tape 1 includes scratch and the like, the envelope detected by the tracing of the recording head 2 has a shape as shown in FIG. 10(b). Flag information corresponding to the envelope shown in FIG. 10(b), after demodulating the reproduced data having the envelope shown in FIG. 10(b) and performing error correction processing by the internal-code decoder 5, the memory 6 and the external-code decoder 7, has the shape of final flags as shown in FIG. 10(c). In this case, an L state of the flag information indicates that no error data is included within the corresponding internal-code block, and an H state of the flag information indicates that error data is present and interpolation processing is necessary.

After completing error correction processing, respective data are sequentially read from the read controller 9. The read controller 9 controls a reading operation in response to a DOS generated from the DOS generator 4 as a result of comparison of the envelope of reproduced data with a threshold determined by the DOS-threshold controller 8.

The DOS generator 4 includes a delay circuit for delaying the envelope input from the reproducing head 2 in consideration of the time required for data subjected to error correction processing to be read to the high-efficiency decoder 10.

The envelope is determined using the threshold. As shown in FIG. 10(d), if the envelope is greater than the threshold, it is assumed that the reliability of data is secured, and an L state is generated as a DOS. If the envelope is smaller than the threshold, it is assumed that the reliability of data is low and there is a possibility of erroneous correction, and an H state is generated as a DOS. That is, if the DOS assumes an L state, the read controller 9 reads data and flag information. If the DOS assumes an H state, a reading operation of data is inhibited, and the flag information is made in an H state and is supplied to the high-efficiency decoder 10.

The threshold for generating an DOS is variable, and is controlled by the DOS-threshold controller 8. The control is performed by counting the interval of an H state of the final flag while the DOS assumes an H state, and causing the ratio of the final flag to converge to a constant value.

For example, suppose that for the envelope shown in FIG. 10(b), a DOS as shown in (3) of FIG. 10(d) is generated using the threshold (3) in FIG. 10(b). At that time, it is determined that the ratio of the final flag is small, and the level of the DOS is lowered. Thus, normal data, for which a reading operation has been inhibited by the DOS, is enabled and is input to the high-efficiency decoder 10.

Suppose that the threshold is lowered from (3) of FIG. 10(b) to (1) of FIG. 10(b). In this case, the DOS becomes (1) of FIG. 10(d), and the ratio of the final flag (FIG. 10(c)) in the H state of the DOS increases, so that erroneously-corrected data may, in some cases, be output without being subjected to read inhibit. Accordingly, the DOS-threshold controller 8 performs the control of increasing the threshold for the DOS in order to prevent the possibility of output of erroneously-corrected data. The threshold converges to the value (2) in FIG. 10(b), and an optimum DOS ((2) of FIG. 10(d)) is obtained.

When obtaining the ratio of the final flag, the time period in which the DOS assumes an H state is made at least a few tracks in order to prevent minute variations of the threshold. The amount of change of the threshold may be determined from the ratio of the target amount of the flag to the actual amount of the flag. Alternatively, the amount of change of the threshold may be set to a constant value, and the threshold may be converged.

The high-efficiency decoder 10 performs expansion processing of data and flags, and the interpolation memory 11 performs interpolation of data based on flag information.

Next, features of a fourth embodiment of the present invention will be described with reference to FIG. 11.

The present embodiment has a feature in that the external-code decoder 7 of the third embodiment shown in FIG. 8 is replaced by a repeat decoder 13, and that the result of repeated error-correction decoding is determined within a time period determined by a DOS, and the threshold for a DOS is converged to an appropriate value. In FIG. 11, the same components as those in the third embodiment are indicated by the same reference numerals, and a description thereof will be omitted.

Figure 11:
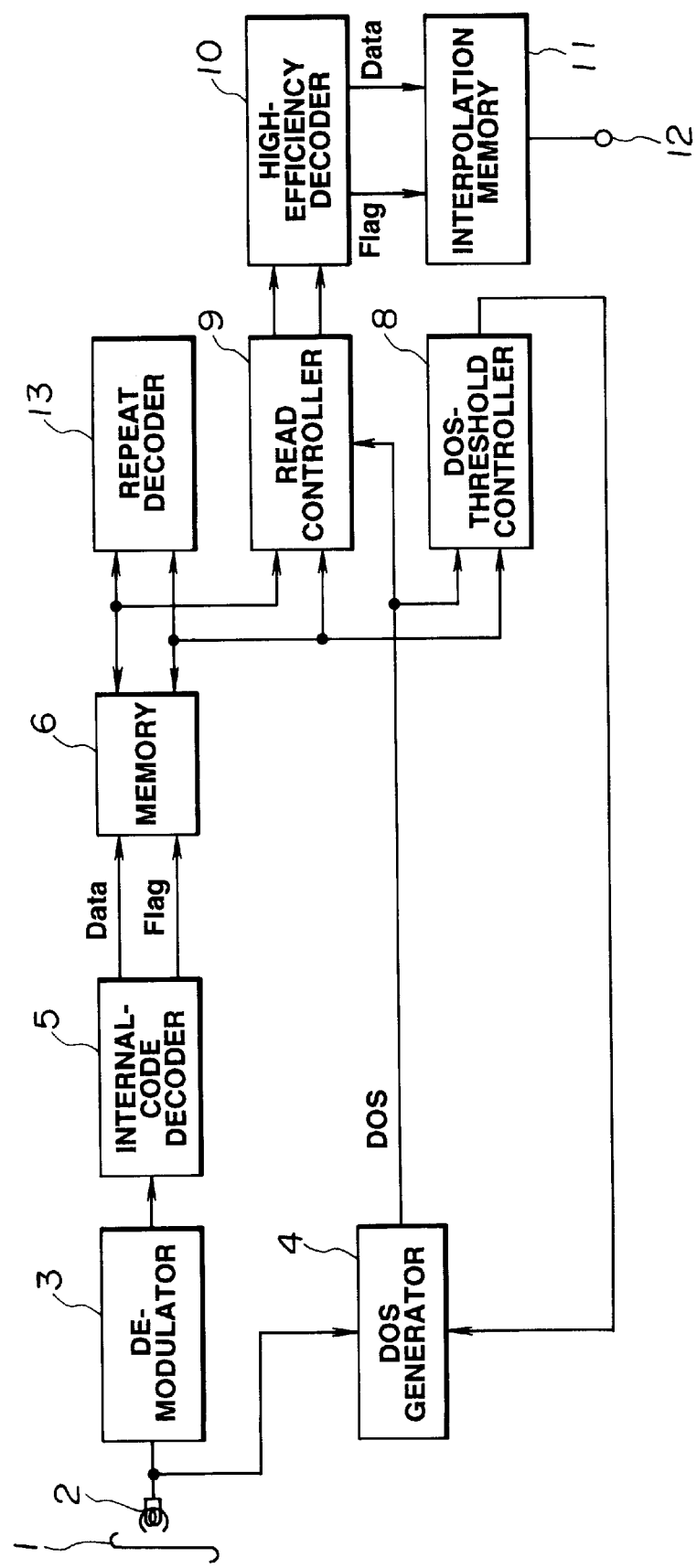
FIG. 11 is a schematic block diagram illustrating the configuration of an image reproducing apparatus according to a fourth embodiment of the present invention.

In FIG. 11, a repeat decoder 13 can execute error correction processing of internal codes and external codes. Data input and output terminals of the repeat decoder 13 is connected to the memory 6. Data subjected internal-code decoding by the internal-code decoder 5 is stored in the memory 6. The repeat decoder 13 performs external-code decoding of the data subjected to internal-code decoding stored in the memory 6, and the result of the decoding is stored in the memory 6. The repeat decoder 13 performs second internal-code decoding of data subjected to product-code decoding stored in the memory 6. The result of the decoding is stored in the memory 6, and data and flags stored in the memory 6 are read and output to the read controller 9. On the other hand, the DOS-threshold controller 8 outputs an optimum DOS threshold based on the final flag and delayed DOS.

According to such a configuration, also by using the result of repeated decoding, the threshold for the DOS can be converged to an optimum value. Such an approach is effective when the state of a transmission channel is inferior and data cannot be obtained unless repeated correction decoding is performed.

As described above, according to the above-described third and fourth embodiments, by using a result of correction of internal codes for setting a threshold for generating a DOS, it is possible to perform control so as to provide an appropriate threshold. Furthermore, by assuredly performing interpolation processing of reproduced data exceeding the correction capability, it is possible to suppress display of errors due to erroneous correction, and therefore to improve the picture quality.

The individual components designated by blocks in the drawings are all well known in the image recording/reproducing apparatus arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A data reproducing apparatus comprising:
   reproducing means for reproducing signals recorded on a recording medium;
   storing means for storing the reproduced signals;
   detecting means for detecting errors in the reproduced signals;
   control means for controlling a writing operation of the reproduced signals into said storing means so that reproduced signals having an envelope level higher than a predetermined envelope level are written into said storing means, and so that the reproduced signals having an envelope level lower than the predetermined envelope level are inhibited from being written into said storing means; and
   setting means for changing the predetermined envelope level based on a detection result of the detecting means.

2. An apparatus according to claim 1, wherein said reproducing means comprises a rotating magnetic head.

3. An apparatus according to claim 1, wherein the recording medium comprises a magnetic tape.

4. An apparatus according to claim 1, wherein the signals comprise image data and error-correcting data.

5. An apparatus according to claim 1, wherein said setting means changes the predetermined reproduction level in accordance with the detection result of said detecting means and a level of the reproduced signals.

6. An apparatus according to claim 1, wherein said detecting means comprises error correction means for correcting errors in the reproduced signals by using error-correcting data to generate error detection information indicating whether there exists errors which cannot be corrected by said error correction means.

7. An apparatus according to claim 1, wherein said setting means controls the predetermined envelope level based on the detection result of said detecting means and information relating to a threshold for the predetermined level set by said setting means.

8. A data reproducing apparatus comprising:
   reproducing means for reproducing data from a recording medium;
   decoding means for performing error detection of the data reproduced from the recording medium, and for outputting flag information indicating a result of the detection;
   storage means for storing the reproduced data;
   dropout-signal generation means for detecting the amplitude of the reproduced data by using a threshold, and for generating a dropout signal in accordance with the detected amplitude;
   write control means for controlling an operation of writing the reproduced data in said storage means in response to the dropout signal; and
   control means for changing the threshold for generating the dropout signal in accordance with the flag information.

9. A data reproducing apparatus comprising:
   reproducing means for recording and reproducing data;
   decoding means for performing error detection of reproduced data and for outputting flag information in accordance with the error detection;
   storage means for storing the reproduced data;
   dropout-signal generation means for detecting the amplitude of the reproduced data by using a threshold, and for generating a dropout signal in accordance with the detected amplitude;
   write control means for controlling an operation of writing the reproduced data in said storage means in response to the dropout signal;
   detecting means for detecting the flag information; and
   threshold control means for changing the threshold in accordance with an output from said detecting means.

10. A method for reproducing data from a recording medium, comprising the step of:
    reproducing data recorded on the recording medium;
    storing the reproduced data into a memory;
    detecting errors in the reproduced data;
    controlling a writing operation of the reproduced data into said memory so that reproduced data having a predetermined envelope level are written into said memory in said storing step; and
    changing the predetermined envelope level based on a detection result of the detecting step.

11. A method according to claim 10, wherein said reproducing step includes the step of reproducing the data from the recording medium with a rotating magnetic head.

12. A method according to claim 10, wherein the reproducing step comprises the step of reproducing the data from a magnetic tape recording medium.

13. A method according to claim 10, wherein the reproducing step comprises the step of reproducing image data and error-correcting data from the recording medium.

14. A method according to claim 13, wherein said detecting step comprises the step of correcting errors in the image data by using the error-correcting data to generate error detection information indicating whether there exists errors which cannot be corrected by the error correcting step.

15. A method according to claim 10, wherein said setting step changes the predetermined level in accordance with the detection result of said detecting step and a level of the reproduced data.

16. A method according to claim 10, wherein said setting step comprises the step of controlling the predetermined level based on the detection result of said detecting step and information relating to a threshold for the predetermined level set in said changing step.

17. Reproducing apparatus, comprising:
    reproducing means for reproducing signals from a recording medium;
    storing means for storing the reproduced signals;
    detecting means for detecting errors in the reproduced signals;

drop-out signal generating means for comparing an envelope level of the reproduced signals and a threshold value, and for generating a drop-out signal according to the comparison result;

control means for controlling a writing operation of the reproduced signals according to the drop-out signal generated by said drop-out signal generating means so that the reproduced signals having an envelope level higher than the threshold value are written into said storing means, and so that the reproduced signals having an envelope level lower than the threshold value are inhibited from being written into said storing means; and changing means for changing the threshold value according to a detection result of said detecting means.

18. Reproducing apparatus, comprising:

reproducing means for reproducing signals from a recording medium;

drop-out signal generating means for generating a drop-out signal according to a state of the reproduced signals and a threshold value;

storing means for storing the reproduced signals;

control means for controlling a writing operation of the reproduced signal into said storing means according to the drop-out signal generated by said drop-out signal generating means;

error detection means for detecting errors in the reproduced signals; and changing means for changing the threshold value according to a detection result of said error detection means.

19. A reproducing apparatus comprising:

reproducing means for reproducing signals from a recording medium;

drop-out signal generating means for generating a drop-out signal according to a state of the reproduced signals and a threshold value;

error detection means for detecting errors in the reproduced signals; and changing means for changing the threshold value according to a detection result of said error detection means.

20. Apparatus according to claim 19, further comprising:

storing means for storing the reproduced signal; and control means for controlling a writing operation of the reproduced signal into said storing means according to the drop-out signal generated by said drop-out signal generating means.

21. Apparatus according to claim 20, wherein the reproduced signal comprises a plurality of sync blocks which comprise sync data, ID data, image data, and error correction check data, said error detection means detecting errors according to the error correction check data.

22. Apparatus according to claim 21, wherein said control means determines writing addresses of the image data of the plurality of sync blocks according to the ID data.

23. Apparatus according to claim 19, wherein said error detection means generates error flags corresponding to be detected errors, said changing means changing the threshold value according to the error flags.

24. Apparatus according to claim 23, wherein said changing means comprises counting means for counting the error flags generated by said error detection means and changes the threshold value according to be counted result.

25. Apparatus according to claim 19, wherein said changing means operates during a special reproduction mode.

\* \* \* \* \*

UNITED STATES PATENT AND TRADEMARK OFFICE
CERTIFICATE OF CORRECTION

PATENT NO. : 6,061,494
DATED : May 9, 2000
INVENTOR(S) : TAKAYUKI KIKUCHI

It is certified that error appears in the above-identified patent and that said Letters Patent is hereby corrected as shown below:

COLUMN 3:
   Line 19, "veneration" should read --generation--.

COLUMN 6:
   Line 26, "internal code" should read --internal-code--.

COLUMN 8:
   Line 40, "is" should read --are--;
   Line 41, "subjected" should read --subjected to--.

COLUMN 9:
   Line 50, "exists" should read --exist--.

COLUMN 10:
   Line 50, "exists" should read --exist--.

Signed and Sealed this

Twenty-fourth Day of April, 2001

Attest:

NICHOLAS P. GODICI

Attesting Officer    Acting Director of the United States Patent and Trademark Office